(12) United States Patent
Miyaki

(10) Patent No.: US 8,965,888 B2
(45) Date of Patent: Feb. 24, 2015

(54) EVALUATING APPROPRIATENESS OF CONTENT

(75) Inventor: Ken Miyaki, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 573 days.

(21) Appl. No.: 12/247,852

(22) Filed: Oct. 8, 2008

(65) Prior Publication Data

US 2009/0094187 A1 Apr. 9, 2009

Related U.S. Application Data

(60) Provisional application No. 60/978,325, filed on Oct. 8, 2007.

(51) Int. Cl.
*G06F 17/30* (2006.01)
*G06F 21/62* (2013.01)

(52) U.S. Cl.
CPC .... *G06F 21/6218* (2013.01); *G06F 2221/2149* (2013.01)
USPC ........... 707/732; 707/737; 707/741; 707/748; 707/754

(58) Field of Classification Search
USPC ................... 707/707.713, 723, 748, 758, 781
See application file for complete search history.

(56) References Cited

U.S. PATENT DOCUMENTS

| | | | |
|---|---|---|---|
| 7,584,223 B1 * | 9/2009 | Pinkas et al. | 1/1 |
| 7,827,183 B2 * | 11/2010 | Fraser et al. | 707/748 |
| 2002/0120609 A1 * | 8/2002 | Lang et al. | 707/1 |
| 2003/0004927 A1 * | 1/2003 | Zhai | 707/1 |
| 2003/0037041 A1 * | 2/2003 | Hertz | 707/1 |
| 2004/0172378 A1 * | 9/2004 | Shanahan et al. | 707/1 |
| 2004/0230598 A1 * | 11/2004 | Robertson et al. | 707/102 |
| 2006/0149695 A1 * | 7/2006 | Bossman et al. | 706/48 |
| 2006/0293921 A1 * | 12/2006 | McCarthy et al. | 705/2 |
| 2007/0073694 A1 * | 3/2007 | Picault et al. | 707/9 |
| 2007/0112845 A1 * | 5/2007 | Gilmour et al. | 707/102 |
| 2007/0233671 A1 * | 10/2007 | Oztekin et al. | 707/5 |
| 2008/0004939 A1 * | 1/2008 | Li et al. | 705/10 |
| 2008/0065718 A1 * | 3/2008 | Todd et al. | 709/203 |
| 2008/0162537 A1 * | 7/2008 | Mancini | 707/102 |

* cited by examiner

*Primary Examiner* — Mohammad S Rostami
(74) *Attorney, Agent, or Firm* — Procopio, Cory, Hargreaves & Savitch LLP

(57) ABSTRACT

Evaluating content, comprising: setting threshold levels for desired categories of attributes which are to be used to evaluate the content, wherein the content has a set of attributes; comparing the set of attributes of the content to the threshold levels for desired categories; and allowing access to the content when the set of attributes of the content is within the threshold levels.

14 Claims, 5 Drawing Sheets

EVALUATING APPROPRIATENESS OF CONTENT

CROSS-REFERENCE TO RELATED APPLICATIONS

This application claims the benefit of priority of U.S. Provisional Patent Application No. 60/978,325, filed Oct. 8, 2007, entitled "method and Apparatus for Evaluating Content." The disclosure of the above-referenced provisional application is incorporated herein by reference.

BACKGROUND

1. Field of the Invention

The present invention relates to evaluating the appropriateness of content, and more specifically, to evaluating content against a user profile to determine whether the content is appropriate for the user.

2. Background

The growth of the Internet and online content has proved to be a valuable asset to society. The ease and amount of content available to the general public is unprecedented. While there are many benefits for easy access to multiple sources of content, there is also a negative impact. Users can be exposed to content that they find undesirable and may prefer not to be exposed to such content.

A conventional technique to prevent users from being exposed to objectionable online content is to provide blocking (or filtering) software. The blocking software can be used to block access to Web sites or other content that the user has determined to be undesirable. While the blocking software is useful, it has several drawbacks. For example, the blocking software is not 100% successful in filtering all objectionable content or Web sites from being accessed by the user. Further, the blocking software may inadvertently block or censor generally worthwhile or wholesome information or Web sites, which prevents the user from accessing the desirable content. Another drawback to the blocking software is that it typically requires the user to access or be exposed to the questionable content or Web site before the user can add the Web site or content to the blocking list. That is, the user has to be exposed to the content that the user is trying to avoid before the Web site or identified content can be added to the blocking list.

SUMMARY

In one aspect, a method of evaluating content is disclosed. The method includes: setting threshold levels for desired categories of attributes which are to be used to evaluate the content, wherein the content has a set of attributes; comparing the set of attributes of the content to the threshold levels for desired categories; and allowing access to the content when the set of attributes of the content is within the threshold levels.

In another aspect, a method of filtering content is disclosed. The method includes: establishing a user profile of acceptable levels of selected attributes related to the content; accessing the content having a set of attributes; evaluating the accessed content with respect to the established user profile; determining whether the content is acceptable; and allowing access to the content if the content is acceptable, otherwise denying access to the content if the content is not acceptable.

In another aspect, a method of searching for content is disclosed. The method includes: establishing a profile of desired levels of selected attributes related to the content; receiving the content substantially matching the profile, wherein the content has a set of attributes; evaluating the received content; determining whether the content is appropriate based upon the profile; and accessing to the content when the content is appropriate.

Other features and advantages of the present invention will become more readily apparent to those of ordinary skill in the art after reviewing the following detailed description and accompanying drawings.

DETAILED DESCRIPTION

Figure 1:
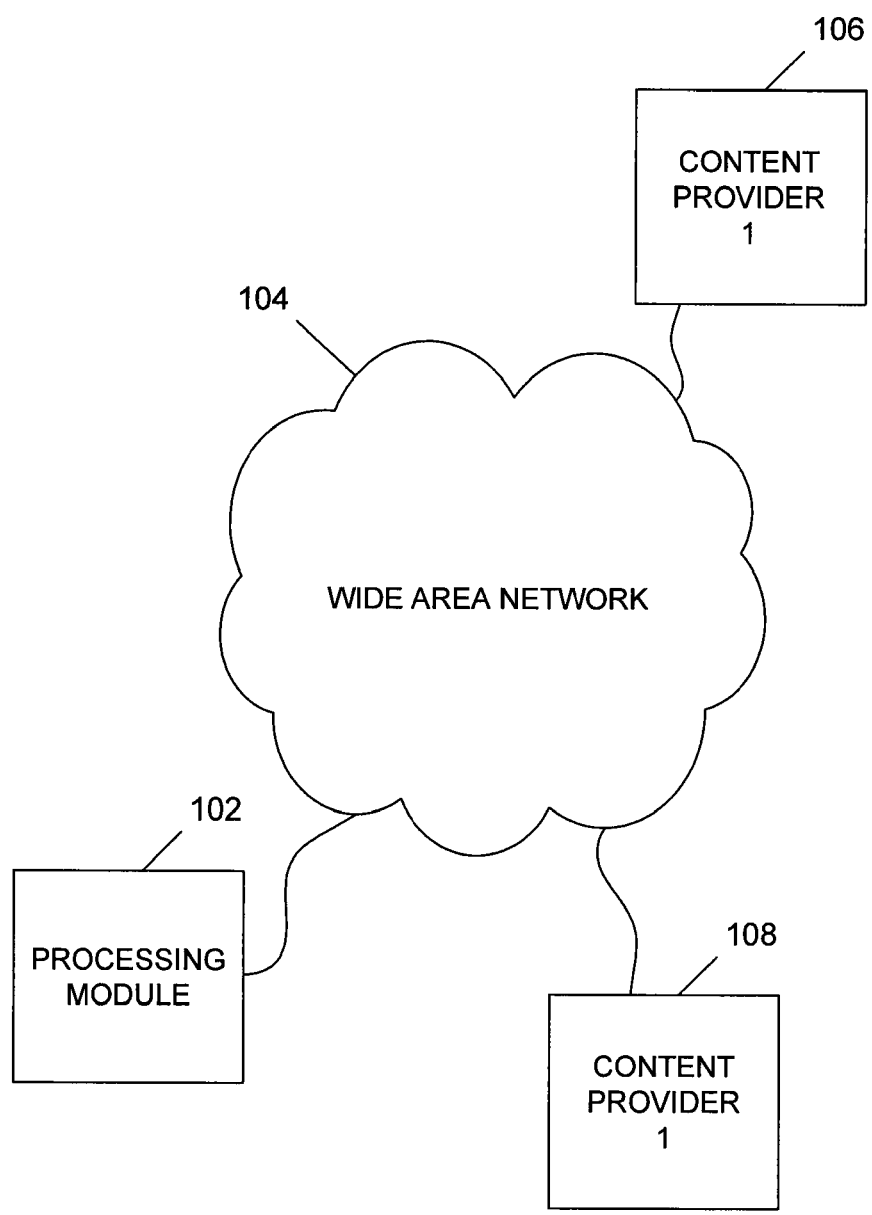
FIG. 1 is a block diagram of a network in accordance with an embodiment of the present invention.

After reading the following description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

In one embodiment, a user sets a "threshold" level for an attribute, or category or asset, or content wherein content is evaluated to determine if it includes amounts, or levels, of the attribute that exceeds the user's threshold. For example, the content can be evaluated and if it is determined that the content includes an attribute that exceeds the threshold level, the content can be filtered and the user denied access to the content. In another example, a participant of a message board can be identified, or flagged, for each message board post (or word) by the participant that exceeds a user's threshold level. In another example, a user can set a threshold level for a vulgarity filter. In this example, if the participant has posted 56 messages (or words) that are flagged by a vulgarity filter and a user's vulgarity threshold is set to 20, then the user will not see any posts from the participant.

In general, an attribute can be automatically triggered and counted when the attribute is detected in the content, such as a swear word triggering a vulgarity filter. Further, filtering may be based on community feedback about a participant, or attribute of content, such as "votes against a participant for posting sexual, racist, or threatening content." In one embodiment, the content is not text. For example, the content may be a photo, video, or music. Further, the filtering can take into account multiple different attributes of the content.

Filtering can also be any logical combination of attributes. For example, a filter can operate so as to only allow content that satisfies the logical combination of attributes according to: "(vulgarity count<20) AND (racial slurs<1) AND (sexual scenes<5)." In this example, the user profile is for someone who tolerates a little vulgarity (20 instances in the content), absolutely no racism (regardless of whether it was a community feedback that identified a poster as putting up racist comments or whether there was some automated process that identified a piece of content as racist or an administrator/moderator that identified it), and is willing to take some amount of sexuality (less than 5 scenes).

The techniques described can be beneficial, for example, to parents who can setup a profile for their children so that their children will not have to see existing posts by people who exceed the thresholds established for attributes in the profile. It is also beneficial for users to not have their experience interrupted by having to "go out of their way" to add a user to their user-block list when browsing the content. Further, the techniques described can be used in conjunction with, and augment, a user-based block list.

In one embodiment, a user sets thresholds on a variety of attributes so that the user does not have to be exposed to the undesirable content. By allowing the user to set the thresholds, evaluation of content is provided on a custom or user basis. In one embodiment, once a user has set the desired thresholds, the content evaluation application, such as a filtering application, can evaluate metadata associated with content that is being accessed by the user. The content filtering application can provide feedback to the user about instances of the content that exceed the threshold levels set by the user. For example, a user can set thresholds, such as a threshold setting for vulgarity, profanity, or sexual content, so that the user is not exposed to content that includes undesired levels of selected categories that exceed the threshold setting.

By setting threshold levels, the user is providing a measurable standard by which content can be evaluated. In one embodiment, when the user wants to set a vulgarity filter the user may provide a threshold that will establish the number of swear words in a piece of content that is considered acceptable. For example, a user can set a threshold that if the content exceeds a predetermined number of profane or swear words, the user does not want access to that content. Thus, if the content includes only an occasional swear words, the user may be willing to accept the content so that not all content containing swear words is excluded. However, by setting the level to a specific number of swear words in the content, the user can exclude content that has more than that number of swear words.

Other examples of categories of threshold levels that can be set include the amount of sexual scenes, the number of racial slurs, or the like contained in a piece of content. Thus, the threshold levels can be set for numerous categories of content. In one example, as the user adjusts thresholds in multiple categories of content, profiles can be established and saved for future use by the user. In another example, profiles can be exported or transmitted to other users in a network or online community. Therefore, different users can have different profiles associated with them, or a user can have multiple profiles depending on the user's mood or the type of content the user desires to review at different instances in time.

Further, community profiles can be developed and distributed to members of the community. Thus, if a user does not want to have to set threshold levels but would rather accept community-based threshold levels that are appropriate, or in accordance with a desired profile. For example, the community may establish a profile for children under 10, a different profile for children from 10 to 16, another different profile for users 16 to 18, and yet another profile for users 18 and over. The user can either accept the community profile or just edit the profile to customize it to the user's preferences.

Further, if the user receives content that is found to be objectionable, the user can provide feedback to the community about which sites and/or content were found to be objectionable. The community may edit or modify the profiles accordingly. For example, if a user selects a community profile, and yet receives content that the user does not think is appropriate for the selected profile, the user can notify the community and the profile can be adjusted, if desired, to better match the profile to the standards of the community.

In another embodiment, threshold levels are set as binary 'yes' or 'no'. For example, if a user does not want to be exposed to any sexual content, the user can have the threshold set so that if there is any sexual content the user will not be able to access that content.

Other categories of filters that can be used in filtering content could include social behavior. For example, although a movie may be rated G it could include scenes of misbehaving children, and a parent, or other user, may not want the child exposed to this type of behavior. Thus, parents can set a behavioral threshold to exclude the misbehavior type of content from access by their child. In one example, social behavior can be characterized as the number of instances a child shows disrespect to authority or other types of behavior that can be identified and/or quantified.

In yet another embodiment, rather than having hard threshold values, the user sets a range of values. For example, a range of values can be set for a particular behavioral aspect so that some amount of the selected behavior would be acceptable, but large amounts of the selected behavior would not be acceptable. Different ranges can be used for different types of content or behavior. For example, some behaviors may not be considered by the user to be as offensive as other behaviors. Therefore, the less offensive behavior may have a wider acceptable range while the more offensive behavior may have a narrower range of acceptable levels.

Accordingly, content can be evaluated (or filtered) based upon a plurality of categories, wherein a level is associated with each category to produce a finer evaluation or filtering of content than is currently available. Various assets within the content can be evaluated to determine if the asset types, and the frequency of occurrence, are appropriate to be provided to the user. Further, the content can be evaluated to provide feedback to the user indicating the portion(s) that was objectionable and/or the quantity of objectionable instances.

In another embodiment, the content evaluation is used to search for content that meets the user's profile. For example, rather than blocking or preventing access to content, the content evaluation can be used to search the Internet or other network for content that matches the user's profile. Thus, a search can be performed to find desirable and/or appropriate content.

Further, while the evaluation is being performed, the user can adjust the threshold levels of various categories to allow or exclude different content corresponding to the categories. For example, if the evaluation application is searching content, and the vulgarity threshold is increased to allow content with increased occurrences of swear words to be accessed, then content that includes an increased number of swear words would be presented. Similarly, if the threshold is decreased for the number of allowed swear words, then additional content would now be excluded. Thus, the content that had previously been presented to the user may now be excluded such that the user may not have access to the previously-accessible content. That is, the user can dynamically adjust threshold levels for different categories during a search of the content. The user can evaluate the results from the search and adjust the profile to include or exclude content. This refines the search to more closely align it with the user's desires. For example, one of the categories can be sports scenes. By increasing or decreasing the threshold level for sports scenes, the profile can be changed to allow or deny access to content that included sports scenes accordingly.

In another embodiment, profiles are selected to research and seek out content for a particular category. For example, if a research is being done to show the evolution of eyeglasses through time, a profile can be set to find the number of instances of people wearing eyeglasses in the content. In one example, movies can be searched to find a number of scenes with people wearing eyeglasses. Thus, the search can identify and provide rankings of the movies according to the number of scenes with people wearing eyeglasses. A desired movie can then be selected based on the number of instances of eyeglasses within the movie, and the selected movie can be viewed to facilitate the research.

In another embodiment, content is selected that meets desired criteria. For example, categories can be set such as "I want to see a movie that contains between 10 and 20 instances of violence, has no sexual scenes, includes scenes of baseball games, and has at least 5 instances of people wearing eyeglasses." In other embodiments, content based on other types of logical combination of categories is searched. In yet another embodiment, content is characterized by a community, and is searched to identify content that includes various attributes or instances of specific items being searched.

Other examples of categories of content which can be a part of the profile include a particular manufacturer as being a source of the content. For example, content that is from a particular manufacturer or associated with a particular model of a consumer product may be desired. In another example, content produced in a particular geographic location or produced during a particular period of time may be desired. Further, categories may include particular type of materials or products. For example, the category searches for a particular protocol of content.

In another embodiment, a category includes the length of time an actor or actress is present within a piece of content. For example, a threshold level for a category can be set to identify content that includes a particular actor or actress in the content for a specific period of time or greater. This allows for excluding, for example, content where an actor or actress simply makes a cameo role.

In another embodiment, categories of location, time, people, and assets are adjusted to any level of granularity desired by the user. For example, if the user were going to relocate to a particular city, the user can adjust the thresholds of various categories to identify content that deals with the particular city at a particular time (e.g., within the last two months). Further, people and assets associated with that content can be identified. In another example, if a user is moving to a town on a lake, the user can identify the location of the town, a time period of interest (e.g., the last six months), and the interested people or assets. In this example, the user may desire to identify people who are water skiers and/or assets such as ski boats. Thus, the user can determine the level of water skiing activity at a particular town within a period of time (e.g., the last several months). Further, a time category can be selected to include the production time of the content and/or the time frame of the content. For example, content may have been produced in the last two months but deals with a period of time which occurs a hundred years ago.

In yet anther embodiment, threshold levels of attributes of content are combined in several different ways. For example, search content thresholds in various categories can be combined using the Euclidean distance to identify content that meets the desired filter profile. Equation 1 below is an example of combining various categories.

$$\delta = \frac{1}{N+1} \sqrt{(X_i - X_{USERi})^2 + (X_j - X_{USERj})^2 + \ldots} \quad \text{Equation (1)}$$

where, $\delta$ is the filter value to determine if the content is acceptable to the user;

N is the number of attributes or categories evaluated;

$X_i$ is the value of the $i^{th}$ attribute of the content;

$X_{USERi}$ is the threshold level value of the $i^{th}$ attribute selected by the user;

$X_j$ is the value of the $j^{th}$ attribute of the content;

$X_{USERj}$ is the threshold level value of the $j^{th}$ attribute selected by the user.

FIG. 1 is a block diagram of a network in accordance with an embodiment of the present invention. As shown in FIG. 1, a processing module (or a computer) 102 is in communication with a wide area network 104 such as the Internet. The wide area network 104 is also in communication with content providers 106 and 108. A user, using the processing module 102, can access content from the content providers 106, 108 via the wide area network 104.

In one embodiment, an application running on the processing module 102 evaluates content that the user is attempting to download, and blocks or filters the content if it is not appropriate according to a profile of selected categories identified by the user. In another embodiment, the user uses the profile of categories to search for content that may be available from content providers on the wide area network. In yet another embodiment, the user accesses an online message board where other users post messages. The messages posted by other users can then be evaluated according to the user's profile. For example, the postings of other users can be examined in accordance with the user's profile, and other users that post inappropriate material can be identified so that the postings of the identified other users will be blocked or filtered.

Figure 2:
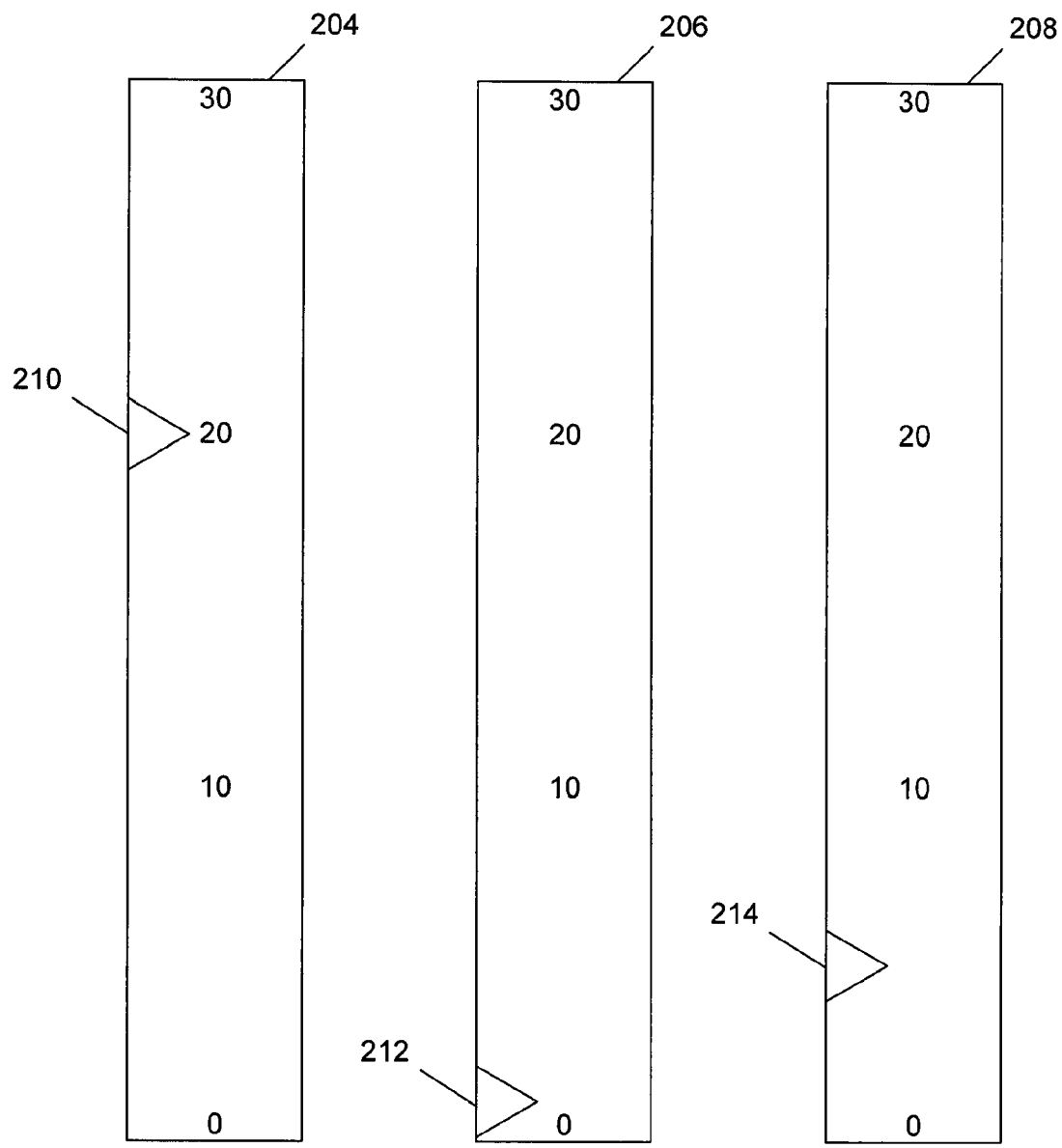
FIG. 2 is a diagram illustrating an example of setting threshold levels for various categories.

FIG. 2 is a diagram illustrating an example of setting threshold levels for various categories. As shown in the example of FIG. 2, there are three categories 204, 206 and 208 representing three different attributes. For example, the first category 204 can be a vulgarity level; the second category 206 can be a racial slurs level; and the third category 206 can be a sexual content level. Sliders 210, 212 and 214 associated with each category can be adjusted by a user to set a corresponding threshold level of each of the categories. For example, the user can set the vulgarity category 204 to a threshold level of 20 as indicated by the position of slider 210; set the racial slurs category 206 to a threshold level of 1 as indicated by slider 212; and the sexual content category 208 to a threshold level of 5 as indicated by slider 214. In the example of FIG. 2, the threshold levels for the various categories can be adjusted between 0 and 30. However, in other embodiments, other scales can be used to adjust the threshold level, for example 1 to 10, 1 to 100, A to F, and so on.

In one embodiment, by setting thresholds to desired levels, some content is blocked or filtered out, and access to the content is restricted. However, other content is allowed and made accessible. The initial settings of the threshold levels for the various content categories can be set by a community profile which can be downloaded by a user. The user can accept this community profile and use it to filter content or to search for content. Further, the community levels can be modified to desired settings.

In another embodiment, a community level profile is used to access content. During this process, a user may believe that the profile is not set correctly for the intended audience of the profile. For example, a parent may download a profile for his or her eight-year-old child. As the child navigates the wide area network (e.g., the Internet) using the downloaded profile, and accesses content, the parent may realize that the profile allows the child access to what the parent believes is inappropriate content. The parent can then adjust the threshold levels to better match what the parent believes is an appropriate profile for the child. Once the parent has adjusted the threshold levels to the appropriate settings, the parent can save the updated profile. Further, the parent can export (or upload) the updated profile to the community where the profile can be evaluated by other members of the community. Thus, the evaluation can determine whether the updated profile is more appropriate for the particular age group of children, such as children under 10.

Figure 3:
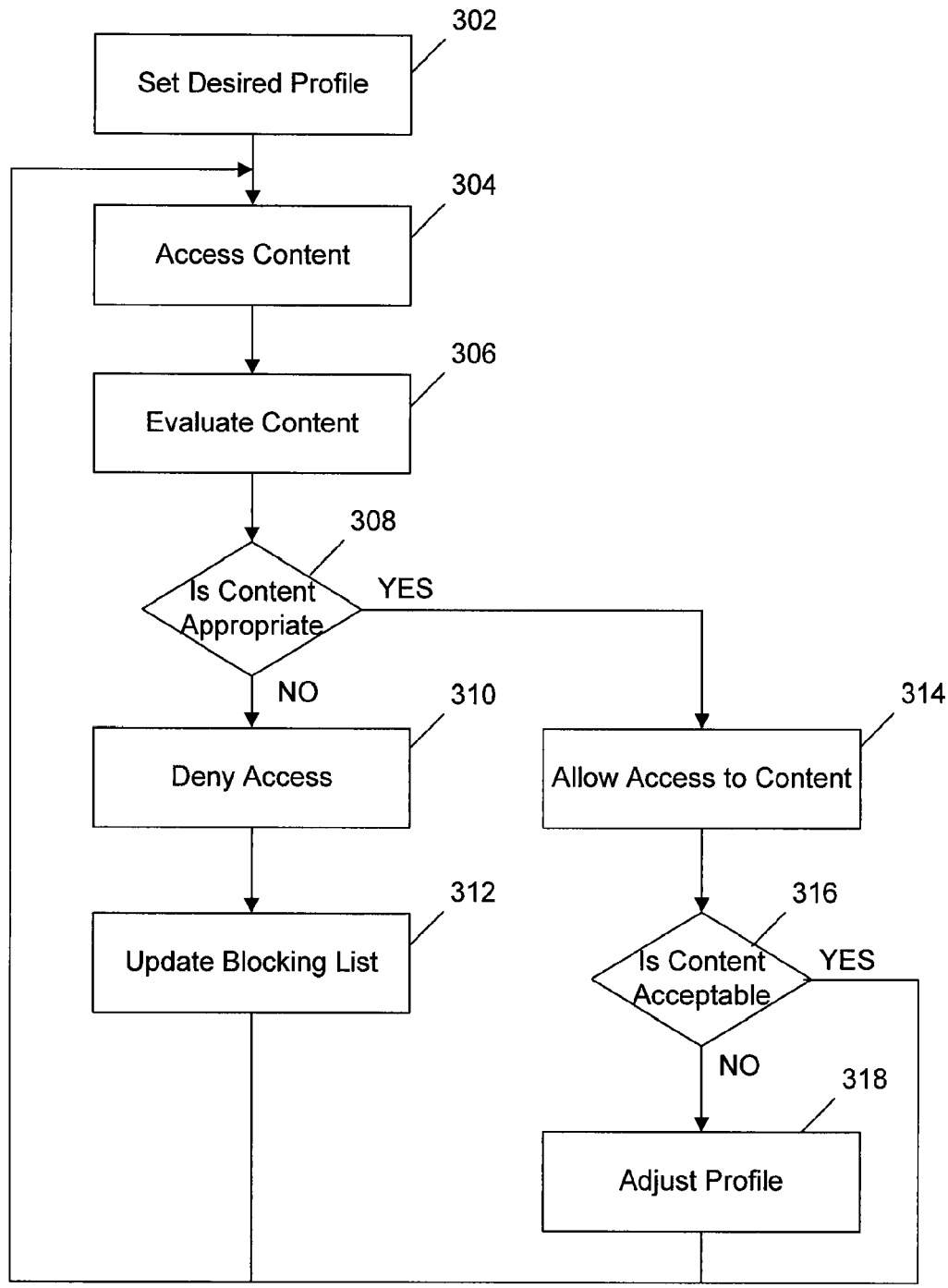
FIG. 3 is a flow chart illustrating a process of evaluating content according to an embodiment of the present invention.

FIG. 3 is a flow chart illustrating a process of evaluating content according to an embodiment of the present invention. Initially, a desired profile is set, in block 302. For example, a user can set filter levels of various categories to desired levels. In another example, a user can use a preset profile, such as a community profile. Then, in block 304, the user attempts to access and receive content. For example, the user attempts to download content using the Internet. The content is evaluated, in block 306, by comparing the attributes of the content to the desired profile. The propriety of the content is determined, in block 308.

If it is determined (in block 308) that the content is not appropriate, then access to the content is denied, in block 310, and a block list is updated, in block 312. Otherwise, if it is determined (in block 308) that the content is appropriate, then access to the content is allowed, in block 314. In block 316, the user evaluates the content and determines whether the content is acceptable. That is, in block 316, the user determines whether the content is acceptable or not. Thus, if it is determined, in block 316, that the content is acceptable (or desirable), then the user continues to access content, in block 304. Otherwise, if it is determined, in block 316, that the content is not desirable and that it should be blocked, the profile is adjusted, in block 318. The user can adjust the profile so that it blocks access to the current content, as well as to other content that is similar to the current content. A blocking list can also be updated, in block 318. Further, in block 318, the user can export the profile information to the community, and the community can determine if the community profile should be updated.

In a further embodiment, the process of evaluating content includes: setting threshold levels for desired categories of attributes which are to be used to evaluate the content, wherein the content has a set of attributes; comparing the set of attributes of the content to the threshold levels for desired categories; and allowing access to the content when the set of attributes of the content is within the threshold levels.

Figure 4:
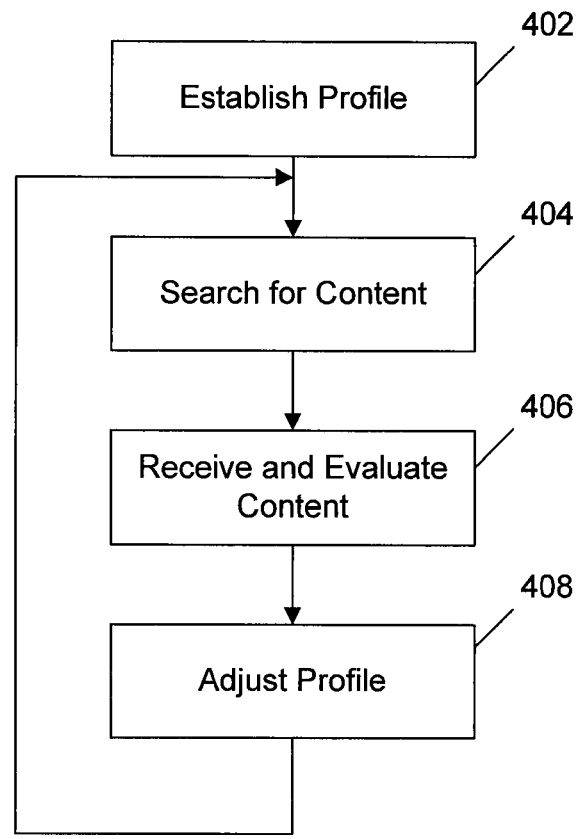
FIG. 4 is a flow chart illustrating a process of searching for content that matches a profile.

FIG. 4 is a flow chart illustrating a process of searching for content that matches a profile. Initially, a desired profile is established, in block 402. In one embodiment, a user establishes a desired profile by adjusting threshold levels of various categories. In another embodiment, a user downloads a community profile for use in searching. Further, if the user downloads a community profile, then the user may modify the profile by adjusting threshold levels for various categories. In block 404, content is searched to match the result with the established profile. For example, the Internet and various Web sites can be searched to try and identify content that matches the desired profile. Content matching the profile is then received and evaluated, in block 406. Depending on the result of the evaluation done in block 406, the profile can be adjusted, in block 408. For example, thresholds of various categories can be raised or lowered either to receive content that had originally been excluded or to exclude content that had originally been allowed. Therefore, the thresholds of various categories can be adjusted (even during the searching process) to fine-tune the search so that search results that are appropriate and adequate can be found. Search is then continued in block 404.

Figure 5:
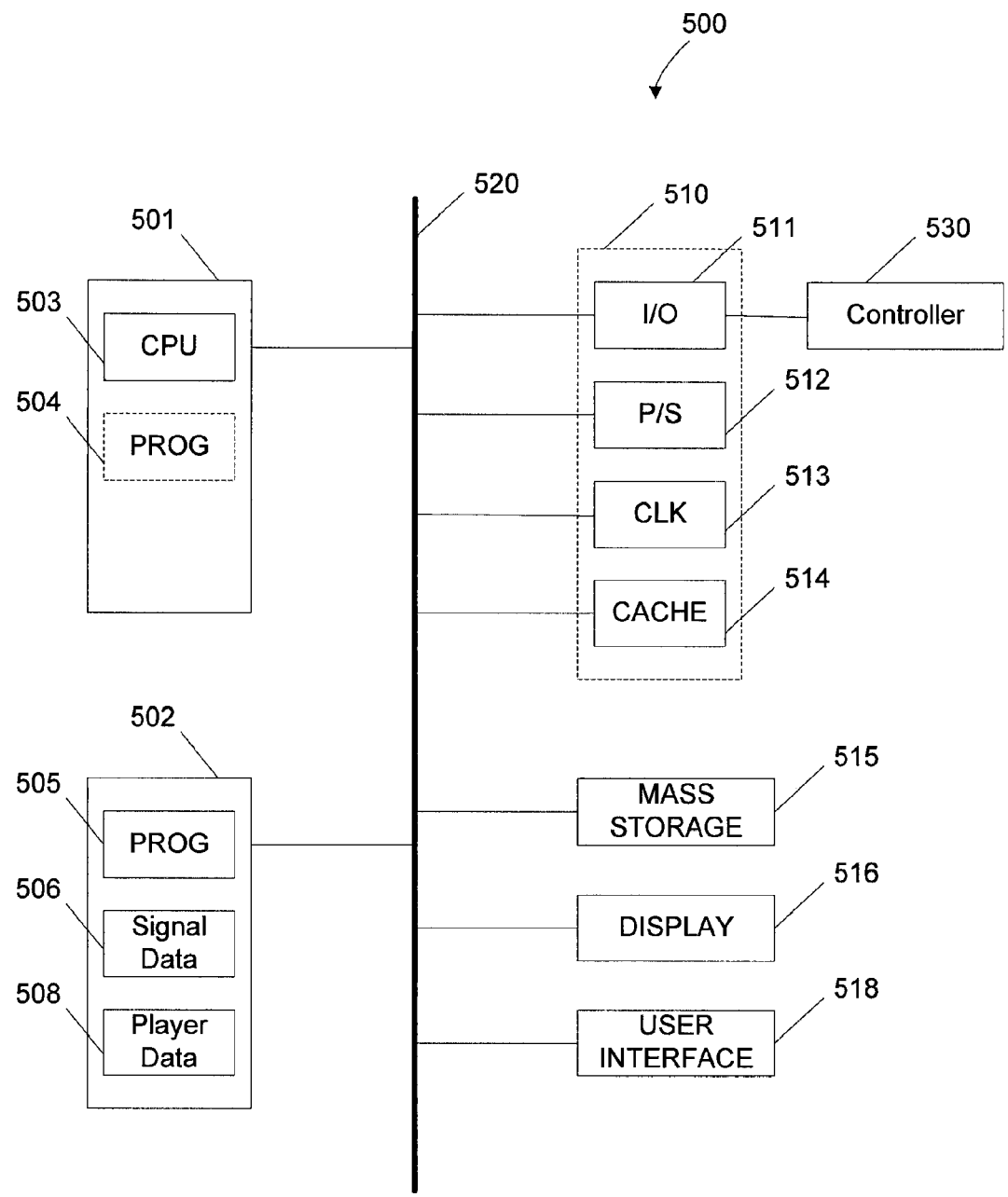
FIG. 5 is a block diagram of a processing system, such as a computer or gaming system, which can be used to implement various embodiments described herein.

FIG. 5 is a block diagram of a processing system 500, such as a computer or gaming system, which can be used to implement various embodiments described herein. As shown in FIG. 5, the processing system 500 may include a processor module 501 and a memory module 502. In one embodiment, memory module 502 may be RAM, DRAM, ROM and the like. The gaming system 500 may have multiple processor modules 501 if parallel processing is to be implemented. The processor module 501 can include a central processing unit 503. Further, the processor module 501 can include local storage or a cache 504 to store executable programs. The memory module 502 can include game program storage 505. The memory module 502 can also include storage 506 for signal data (e.g., data acquired from game controller operated by a user). The memory module 502 can further include storage 508 for player data (e.g., player profile data as well as game statistics).

The processing system 500 may also include a well-known support function module 510 including input/output (I/O) elements 511, power supplies 512, a clock 513, and cache memory 514. The I/O elements 511 may be connected to a game controller 530. The system 500 may also optionally include mass storage module 515 such as a disc drive, CD ROM drive, DVD drive, tape drive or the like to store programs and/or data. The system 500 may also optionally include a display module 516 and/or a user interface module 518 to facilitate interaction between the system 500 and the user. The display module 516 may be in the form of a cathode ray tube, a flat panel screen or any other display module. The user interface module 518 may include a keyboard, mouse, joystick, write pen or other device such as a microphone, video camera or other user input device. The processor, memory, and other components within the system 500 may exchange signals such as code instructions and data with each other via a system bus 520.

Various embodiments described may be implemented primarily in hardware, or software, or a combination of hardware and software. For example, a hardware implementation may include using, for example, components such as application specific integrated circuits ("ASICs"), or field programmable gate arrays ("FPGAs"). Implementation of a hardware state machine capable of performing the functions described herein will also be apparent to those skilled in the relevant art.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method of evaluating content, the method comprising:
    setting threshold levels of a community profile for desired categories of attributes which are to be used to evaluate the content having a set of attributes by setting each threshold level of the community profile differently for each category of the desired categories and combining said each threshold level of the community profile;
    comparing the set of attributes of the content to the threshold levels of a community profile for the desired categories and evaluating metadata associated with the set of attributes of the content;
    allowing access to the content when the metadata associated with the set of attributes of the content indicates that the content is acceptable and the set of attributes of the content is within the threshold levels; and
    reviewing the content and suggesting changes to the threshold levels of a community profile when it is determined that the reviewed content is not appropriate with respect to the desired categories of attributes as set for a community of users,
    wherein the metadata associated with the set of attributes of the content indicating that the content is acceptable includes a filter value equal to a square root of a sum of squares of differences between a value of each attribute and a set threshold level of the community profile for said each attribute divided by a number of the set of attributes plus one.

2. The method of claim 1, wherein the threshold levels are selected by a user.

3. The method of claim 2, wherein the threshold levels selected by the user is set as a user profile.

4. The method of claim 3, further comprising
    reviewing the content by the user; and
    adjusting each threshold level of the user profile using a slider when the user determines that the reviewed content is not appropriate with respect to the desired categories of attributes.

5. The method of claim 1, wherein the threshold levels are selected by the community of users.

6. A method of filtering content, the method comprising:
    establishing a user profile of acceptable levels of selected attributes related to the content by setting each acceptable level differently for each attribute and combining said each acceptable level;
    accessing the content having a set of attributes;
    evaluating the accessed content with respect to the established user profile;
    determining whether the content is acceptable by comparing the set of attributes of the accessed content with the user profile of the acceptable levels of selected attributes and evaluating metadata associated with the set of attributes of the content;
    allowing access to the content when the metadata associated with the set of attributes of the content indicates that the content is acceptable and the set of attributes of the content is within the user profile of the acceptable levels, otherwise denying access to the content; and
    reviewing the content and suggesting changes to the user profile of acceptable levels when it is determined that the reviewed content is not appropriate with respect to the selected attributes as established for a community of users,
    wherein the metadata associated with the set of attributes of the content indicating that the content is acceptable includes a filter value equal to a square root of a sum of squares of differences between a value of each attribute and a set threshold level of the community profile for said each attribute divided by a number of the set of attributes plus one.

7. The method of claim 6, wherein the user profile comprises threshold levels for desired categories of attributes.

8. The method of claim 7, wherein said determining whether the content is acceptable comprises
comparing the set of attributes of the content to the threshold levels.

9. A method of searching for content, the method comprising:
receiving a community profile;
establishing a profile of desired levels of selected attributes related to the content for a community of users using the community profile and by setting each desired level differently for each selected attribute and combining said each desired level;
searching for and receiving the content substantially matching the established profile with the desired levels of selected attributes,
wherein the content has a set of attributes;
evaluating the received content;
determining whether the content is appropriate based upon the profile by comparing the set of attributes of the received content with the profile of the desired levels of selected attributes and evaluating metadata associated with the set of attributes of the received content;
accessing the content when the metadata associated with the set of attributes of the content indicates that the content is appropriate and the set of attributes of the content is within the profile of the desired levels; and
reviewing the content and suggesting changes to the profile of desired levels when it is determined that the reviewed content is not appropriate with respect to the selected attributes as established for the community of users,
wherein the metadata associated with the set of attributes of the content indicating that the content is acceptable includes a filter value equal to a square root of a sum of squares of differences between a value of each attribute and a set threshold level of the community profile for said each attribute divided by a number of the set of attributes plus one.

10. The method of claim 9, wherein the profile comprises threshold levels for desired categories of attributes.

11. The method of claim 10, wherein said determining whether the content is appropriate comprises
comparing the set of attributes of the content to the threshold levels.

12. A non-transitory computer-readable storage medium storing a computer program for evaluating content, the program comprising executable instructions that cause a computer to:
set threshold levels of a community profile for desired categories of attributes which are to be used to evaluate the content having a set of attributes
by setting each threshold level of the community profile differently for each category of the desired categories and combining said each threshold level of the community profile;
compare the set of attributes of the content to the threshold levels of a community profile for the desired categories and evaluate metadata associated with the set of attributes of the content;
allow access to the content when the metadata associated with the set of attributes of the content indicates that the content is acceptable and the set of attributes of the content is within the threshold levels; and
review the content and suggest changes to the threshold levels of a community profile when it is determined that the reviewed content is not appropriate with respect to the desired categories of attributes as set for a community of users,
wherein the metadata associated with the set of attributes of the content indicating that the content is acceptable includes a filter value equal to a square root of a sum of squares of differences between a value of each attribute and a set threshold level of the community profile for said each attribute divided by a number of the set of attributes plus one.

13. The non-transitory computer-readable storage medium of claim 12, wherein the content comprises online content.

14. The non-transitory computer-readable storage medium of claim 12, wherein the threshold levels are selected by a user.

* * * * *